United States Patent [19]
Brown et al.

[11] 3,774,501
[45] Nov. 27, 1973

[54] THREAD MILLING ATTACHMENT

[75] Inventors: Roger W. Brown; Hinkley H. Ranney, both of Windsor, Vt.

[73] Assignee: Cone-Blanchard Machine Company, Windsor, Vt.

[22] Filed: Dec. 22, 1971

[21] Appl. No.: 211,004

[52] U.S. Cl. .................... 90/11.64, 10/89, 10/105; 82/5
[51] Int. Cl. .......................... B23g 1/32, B23g 3/00
[58] Field of Search ................. 90/11.64, 11.62, 90/11.48; 29/38 B; 82/5.5, 5; 10/89, 105

[56] References Cited
UNITED STATES PATENTS
1,178,270   4/1916   Schurr .............................. 90/11.64
3,090,283   5/1963   Chaffee, Jr. ...................... 90/11.64

Primary Examiner—Gil Weidenfeld
Attorney—Stephen M. Mihaly

[57] ABSTRACT

A thread milling attachment adapted to be mounted in place of a conventional cross slide on a machine tool to make use of the standard mechanism for feeding the thread cutter radially to the desired depth and rotating the cutter in normal manner by conventional attachment gearing. The tool slide for the cutter spindle is separately mounted from the lead screw thus allowing the cutter spindle to travel at an angle relative to the axis of the work spindles while the lead screw remains substantially parallel to the work spindle axes. Axial movement of the thread milling attachment may also be obtained to move the cutter axially relative to the work into position preparatory to feeding the cutter into the work and to move the drive pinion for the lead screw into engagement with a face gear on one of the work spindles.

15 Claims, 4 Drawing Figures

3,774,501

THREAD MILLING ATTACHMENT

The present invention releates generally as indicated to a thread milling attachment for machine tool such as a multiple spindle automatic screw machine for cutting tapered or straight translating thread forms and the like.

An important aspect of the thread milling attachment of the present invention is that it may be mounted in place of a conventional cross slide on a machine tool to make use of the standard mechanism for feeding the thread cutter radially to the desired depth. The cutter spindle which constitutes a part of the thread milling attachment is normally mounted with its axis parallel to the work spindle axes and may be driven in the normal manner by attachment gearing in the column gear box of the machine tool.

Another important aspect of the present invention is that the tool slide for the cutter spindle has a separate mounting from the lead screw which allows the cutter spindle to travel at an angle determined by tapered ways for the tool slide while the lead screw remains substantially parallel to the work spindle axes. Feeding of the cutter spindle occurs during rotation of the lead screw which has a nut thereon extending into a transverse slot in the tool slide to allow lateral movement of the tool spindle during linear movement thereof.

The thread milling attachment may also be moved axially relatively to the work to bring the cutter into position preparatory to feeding the cutter into the work while at the same time moving a drive pinion on the thread milling attachment into engagement with a face gear on the work spindle. After the thread milling attachment is positioned with the gears engaged and the cutter fed to the desired radial depth, rotation of the work spindle is started through a rack and pinion for slightly more than one revolution controlled by a cam to give a constant feed rate per tooth on the cutter. As the work spindle rotates, a secondary bevel gear train rotates the lead screw which in turn imparts motion to the cutter spindle as aforesaid moving the cutter one pitch of the thread per work spindle revolution.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE PREFERRED EMBODIMENT

Figure 1:
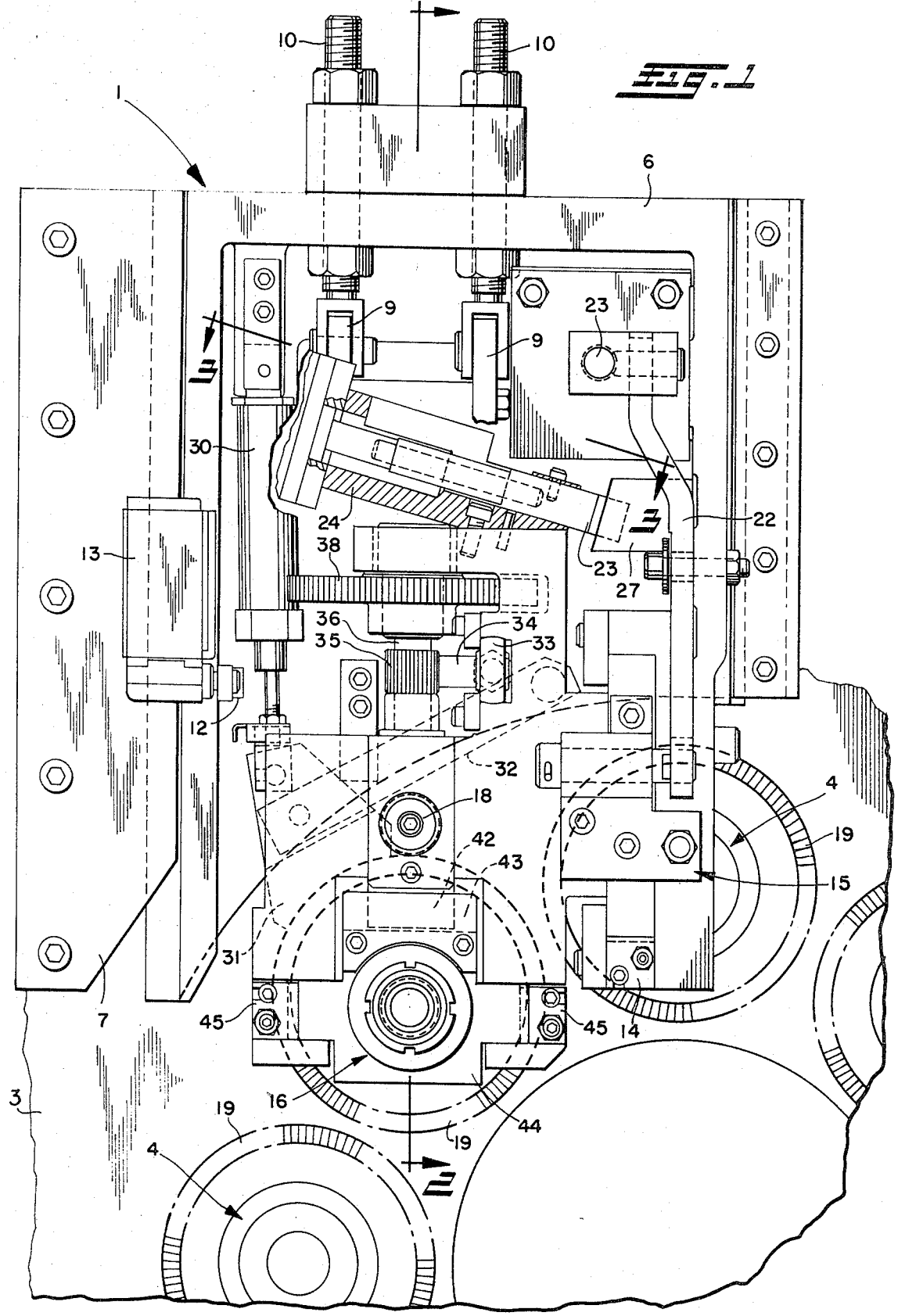
FIG. 1 is a rear elevation view of a preferred form of thread milling attachment constructed in accordance with this invention shown mounted in place of a conventional cross slide on a multi-spindle machine tool, as seen from the plane of the line 1—1 fom the right end of FIG. 2.
Figure 2:
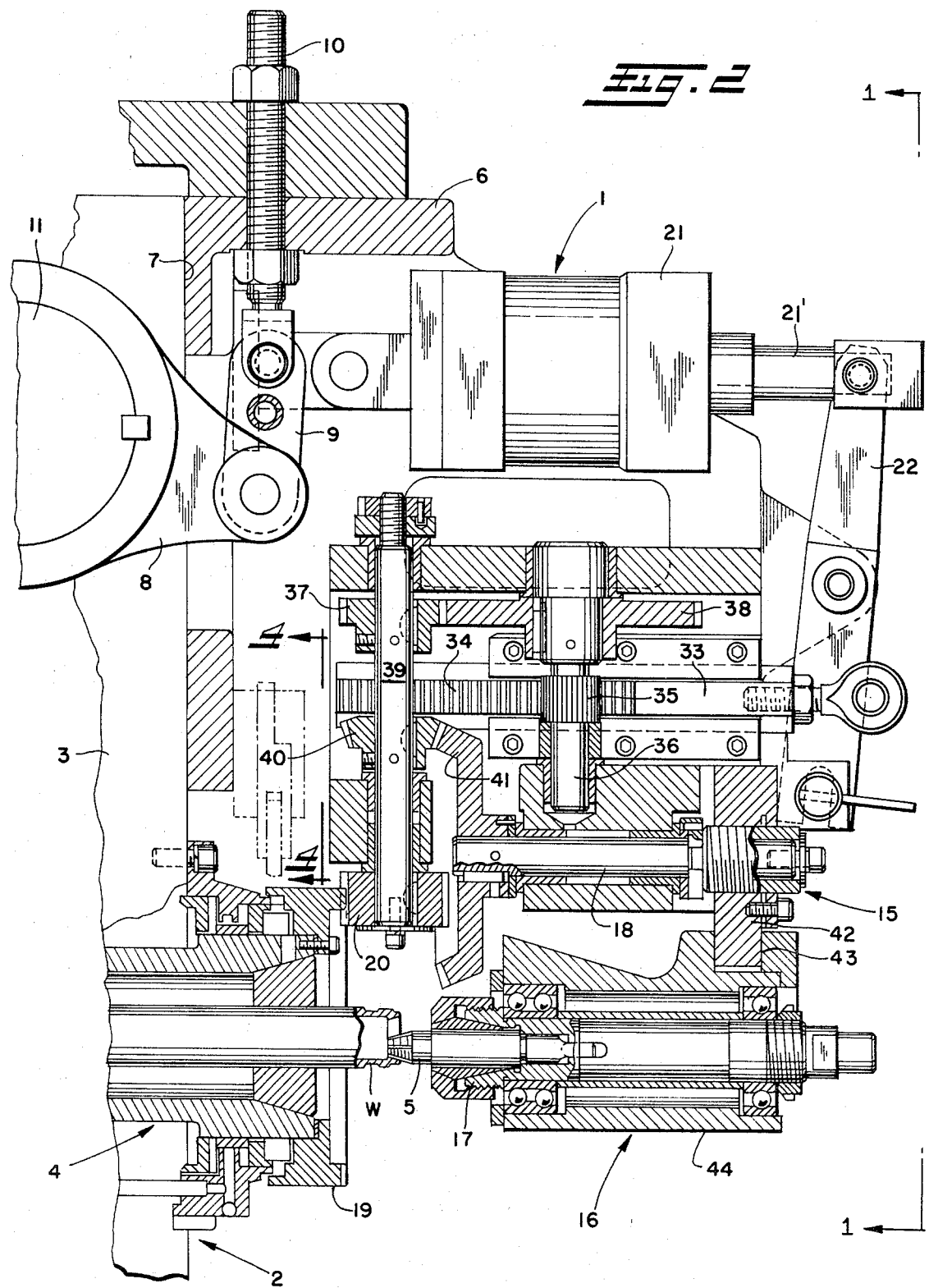
FIG. 2 is a fragmentary longitudinal section through the thread milling attachment of FIG. 1 and one of the work spindles for the machine tool located at the thread milling station, taken on the plane of the line 2—2.

Referring now in detail to the drawings, and initially to FIGS. 1 and 2 thereof, there is shown a preferred form of thread milling attachment 1 in accordance with this invention as applied to a multiple spindle machine tool 2 of known type such as a multiple spindle automatic screw machine. The machine 2 includes a rotatable carrier 3 in which are journalled a plurality of workholding spindles 4 arranged in a circular array around the axis of the carrier. Suitable means, not shown, is provided for indexing the carrier 3 to bring the work spindles 4 carried thereby successively into position at one of a plurality of work stations at which various machining operations may be carried out on the work. The tools which are ordinarily used to perform certain of the machining operations on the work are mounted on cross slides on the machine for radial movement toward and away from the work.

The thread milling attachment 1 of the present invention may be used to produce a translating thread form on the work, and is desirably mounted in place of one of the cross slides to make use of the standard mechanism for feeding the thread milling cutter 5 radially to the desired depth as more fully described hereafter. Such thread milling attachment 1 includes a main slide 6 which fits within one of the radially extending ways 7 on the machine tool 2 in place of a conventional cross slide for radial movement by rotation of crank arms 8 connected to the main slide 6 by links 9 pivoted at one of their ends to the crank arms 8 and at their other ends to longitudinally adjustable elements 10 carried by the main slide 6. The crank arms 8 are in turn keyed to a shaft 11 which may be rotated in known manner by standard mechanism to move the thread milling attachment 1 radially toward and away from a work station. An adjustable positive stop 12 may be provided on the main slide 6 for engagement with a limit switch 13 on the machine 2 (see FIG. 1) to control the feed of the thread milling attachment 1 radially to the desired depth. Mounted on the main slide 6 are tapered gibs or ways 14 extending in a generally axial direction relative to the machine for sliding movement of a tool slide 15 therealong axially relative to the work W.

Carried by the tool slide 15 is a tool spindle 16 having a collet 17 at one end for gripping the thread milling cutter 5. The cutter 5 is desirably a multiple form cutter and is illustrated as being conical for cutting a tapered or conical internal diameter in a part W. However, it should be understood that the same design with minor modificatidns could be used for producing internal, external, tapered or straight threads or worms as desired. Also mounted on the tool slide 15 is a lead screw 18 which when rotated through suitable gearing imparts axial motion to the tool spindle 16 to move the cutter 5 carried thereby axially relative to the work W which may be a piece of bar stock retained in place at the appropriate work station by any one of the work spindles 4.

As best seen in FIG. 2, each work spindle 4 has a face gear 19 attached thereto for engagement by a drive pinion 20 on the tool slide 15 upon movement of the tool slide 15 axially into position adjacent the work as by actuation of a pneumatic cylinder 21. A lever 22 pivoted to the main slide 6 intermediate the ends thereof has one end pivotally connected to the cylinder rod 21' and the other end pivotally connected to the tool slide 15 whereby actuation of the pneumatic cylinder 21 causes axial movement of the tool slide 15 thus to move the drive pinion 20 on the tool slide into engagement with the face gear 19 on the work spindle as aforesaid. At the same time the cutter 5 is moved into position preparatory to feeding into the work.

Figure 3:
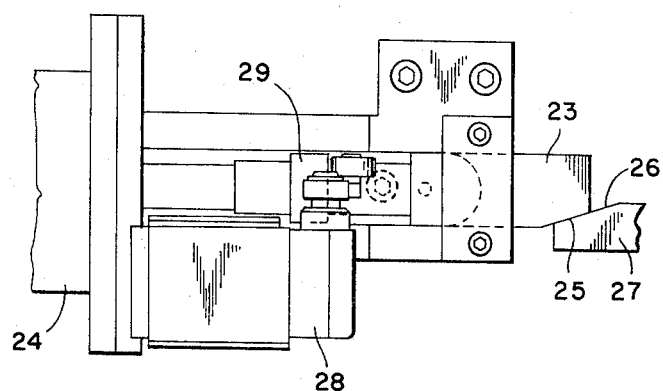
FIG. 3 is a top plan view of the lock mechanism for locking the thread milling attachment in position adjacent the work, taken on the plane of the line 3—3 of FIG. 2.

The depth of drive engagement between the drive pinion 20 on the tool slide and face gear 19 on the work spindle may be determined by engagement of an adjustable hard stop (not shown) on the tool slide 15 with an adjacent surface on the main slide 6, and the tool slide 15 may be locked in place by actuation of a lock pin 23 which is reciprocable by actuation of an air cylinder 24 mounted on the tool slide. As best seen in FIG. 3, the lock pin 23 has a beveled side 25 for wedging engagement with the correspondingly beveled side 26 of a lock bracket 27 suitably fastened to the main slide 6. A limit switch 28 (see FIG. 3) may also be mounted on the air cylinder 24 for engagement by a limit switch actuator 29 on the lock pin 23 which triggers an electrical interlock to prevent the continuation of machine cycle if the slide is not locked into proper working position.

Figure 4:
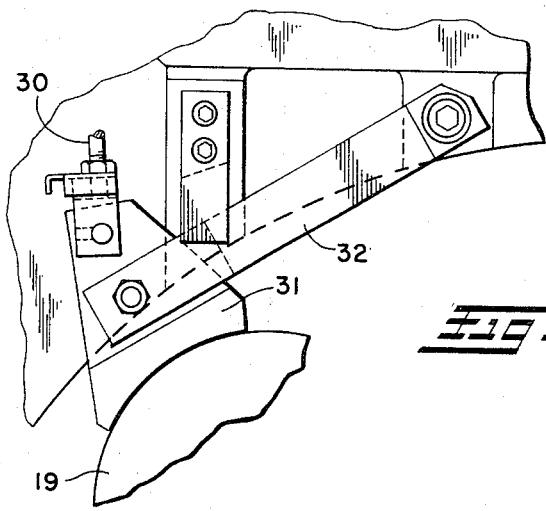
FIG. 4 is a rear elevation view of the stop spindle mechanism for the thread milling attachment, as seen from the plane of the line 4—4 of FIG. 1.

The work spindle 4 at the appropriate work station where the threading operation is to be performed may be retained against rotation during axial movement of the tool slide 15 to bring the drive pinion 20 into engagement with the face gear 19 by actuation of a pneumatic cylinder 30 on the main slide 6 which urges a brake shoe 31 into contact with the outer periphery of the face gear 19 as shown in FIGS. 1 and 4. The brake shoe 31 is pivotally attached to one end of a brake arm 32 which has its other end pivotally connected to the main slide as shown.

After the tool slide 15 is positioned with the drive pinion 20 engaging the face gear 19 and the cutter 5 fed to the desired radial depth, the brake shoe 31 is retracted to permit rotation of the work spindle 4 through actuation of a draw rod 33 (see FIG. 2) whose movements may be controlled in conventional manner by a cam. The draw rod 33 has a rack portion 34 engaging a pinion 35 keyed to a primary drive shaft 36 which drives the drive pinion 20 and thus the work spindle 4 through a suitable gear train including gears 37 and 38 on the drive pinion shaft 39 and primary drive shaft 36, respectively. As the work spindle 4 rotates, a secondary bevel gear train including bevel gears 40 and 41 on the drive pinion shaft 39 and lead screw shaft 18, respectively, also rotates the lead screw 18 which has a nut 42 thereon extending into a transverse slot 43 in the tool spindle housing 44 thus to impart motion to the tool spindle 16 moving the cutter 5 forward one pitch of the thread per work spindle revolution.

Because of the separate mounting for the tool spindle 16 from the lead screw 18, the tool spindle 16 may be made to travel at an angle relative to the lead screw during rotation of the lead screw while the lead screw remains parallel to the work spindle axis by providing tapered gibs or ways 45 on the tool slide 15 (see FIG. 1) for guiding the movements of the tool spindle 16. The transverse slot 43 in the tool spindle housing 44 which receives the lead screw nut 42 permits the tool spindle 16 to travel at an angle determined by the tapered ways 45 while maintaining the axis of the tool spindle parallel to the work spindle and driving the tool spindle in the normal manner by attachment gearing, now shown. That is, as the tool spindle 16 is advanced axially by rotation of the lead screw 18, the tool spindle may also be caused to move laterally or transversely of the lead screw as determined by the taper or angular direction of the gibs or ways 45 relative to the lead screw. The work spindle 4 rotation is controlled to give a constant feed rate per tooth on the cutter 5, and continues for slightly more than one rotation to make certain that the thread is cut full on the work W for the entire circumference.

From the foregoing, it will now be apparent that the thread milling attachment of the present invention is readily adaptable for mounting on a conventional machine tool, and includes a separate mounting for the tool spindle from the lead screw which allows the tool to move at an angle relative to the axes of the work spindles while the lead screw remains substantially parallel to the work spindle axes.

The embodiments of the invention in which an exclusive property or privilege is claimed are defined as follows:

1. A thread milling attachment comprising a main slide, a first way on said main slide extending at an angle to the longitudinal axis of said main slide, a tool slide engaging said first way for movement therealong angularly relative to such longitudinal axis, means for moving said tool slide along said first way, a lead screw journalled in said tool slide for rotation, a tool spindle, means mounting said tool spindle on said tool slide separately from said lead screw for movement of said tool spindle at an angle relative to the axis of said lead screw during rotation of said lead screw, and means for rotating said lead screw to cause such angular movement of said tool spindle relative to said lead screw.

2. The thread milling attachment of claim 1 wherein said means mounting said tool spindle separately from said lead screw comprises a second way on said tool slide extending at an angle relative to the axis of said lead screw, and means for converting rotational movement of said lead screw into linear movement of said tool spindle along said second way.

3. The thread milling attachment of claim 2 wherein said tool spindle includes a housing, and said last-mentioned means comprises a transverse slot in said housing, and a nut on said lead screw extending into said transverse slot, said transverse slot permitting lateral movement of said tool spindle during linear movement thereof.

4. The thread milling attachment of claim 3 wherein the axis of said tool spindle is parallel to the axis of said lead screw.

5. The thread milling attachment of claim 1 further comprising locking means for locking said tool slide in adjusted position along said second way, said locking means including a lock pin, a cylinder mounted on said tool slide for reciprocating said lock pin, and a lock bracket on said main slide engageable by said lock pin when said tool slide is in adjusted position.

6. The thread milling attachment of claim 5 wherein said lock pin and lock bracket have correspondingly beveled sides for wedging engagement with each other, and a limit switch controls the movement of said lock pin toward said lock bracket.

7. The thread milling attachment of claim 1 wherein said means for rotating said lead screw comprises a draw rod axially movable relative to said tool slide, said draw rod having a rack portion thereon, a primary drive shaft on said tool slide having a pinion thereon engaging said rack, a secondary drive shaft on said tool slide, interengaging gears on said primary and secondary drive shafts for rotating said secondary drive shaft by rotation of said primary drive shaft, and additional interengaging gears on said secondary drive shaft and lead screw for rotating said lead screw by rotation of said secondary drive shaft.

8. The thread milling attachment of claim 7 further comprising a drive pinion on said secondary drive shaft adapted to engage a face gear on a work spindle for controlling rotation of the work spindle to provide a constant feed rate for said tool spindle.

9. The thread milling attachment of claim 1 wherein said means for moving said tool slide along said first way comprises a lever pivotally connected to said main slide intermediate the ends thereof, and a cylinder having a rod pivotally connected to one end of said lever, the other end of said lever being pivotally connected to said tool slide.

10. In combination, a machine tool including a rotatable work spindle, and a radially extending way, a thread milling attachment radially slidable in said way toward and away from said work spindle, said thread milling attachment comprising a main slide engaging said radially extending way for movement therealong, a second way on said main slide extending toward said work spindle, a tool slide engaging said second way for movement therealong, a tool spindle carried by said tool slide for movement therewith, means for moving said main slide along said radially extending way to position said tool spindle radially with respect to said work spindle, means for moving said tool slide along said second way to adjust said tool spindle axially with respect to said work spindle, a lead screw journalled in said tool slide for rotation, means mounting said tool spindle on said tool slide separately from said lead screw for movement of said tool spindle at an angle relative to said lead screw during rotation of said lead screw, and means for rotating said lead screw to cause such movement of said tool spindle.

11. The combination of claim 10 further comprising a face gear on said work spindle, and a drive pinion on said tool slide movable into engagement with said face gear on said work spindle, during axial movement of said tool slide toward said work spindle, and means for effecting simultaneous rotation of said lead screw and drive pinion for controlled rotation of said work spindle to provide a constant feed rate to said tool spindle per revolution of said work spindle.

12. The combination of claim 11 further comprising brake means for retaining said work spindle against rotation during axial movement of said tool slide to bring said drive pinion on said tool slide into engagement with said face gear on said work spindle.

13. The combination of claim 12 wherein said brake means comprises a brake arm having one end pivotally connected to said main slide, a brake shoe carried by the other end of said brake arm, and a cylinder for moving said brake arm and brake shoe carried thereby into and out of engagement with the outer periphery of said face gear.

14. The combination of claim 10 wherein said machine tool includes a rotatable carrier on which a plurality of said work spindles are journalled in circular array around the axis of said carrier, and means are provided for indexing said carrier to bring said work spindles carried thereby into position at a work station with which said thread milling attachment is associated.

15. A thread milling attachment comprising a support member, a lead screw journalled in said support member for rotation, a tool spindle, means mounting said tool spindle on said support member separately from said lead screw for movement of said tool spindle at an angle relative to the axis of said lead screw during rotation of said lead screw, and means for rotating said lead screw to cause such angular movement of said tool spindle relative to said lead screw, said means mounting said tool spindle separately from said lead screw comprising a guideway on said support member extending at an angle relative to the axis of said lead screw, and means for converting rotational movement of said lead screw into linear movement of said tool spindle along said guideway, said tool spindle including a housing, and said last-mentioned means comprising a transverse slot in said housing, and a nut on said lead screw extending into said transverse slot, said transverse slot permitting lateral movement of said tool spindle during linear movement thereof.

* * * * *